UNITED STATES PATENT OFFICE.

LEO STEIN, OF NEW YORK, N. Y., ASSIGNOR OF ONE-HALF TO JOHN C. DEHLS, OF BROOKLYN, NEW YORK.

COMPOUND FOR USE IN BREWING FERMENTED BEVERAGES.

981,325.  Specification of Letters Patent.  Patented Jan. 10, 1911.

No Drawing.   Application filed July 26, 1910.  Serial No. 574,002.

*To all whom it may concern:*

Be it known that I, LEO STEIN, a subject of Germany, and a resident of New York city, in the county of New York and State of New York, have invented certain new and useful Improvements in Compounds for Use in Brewing Fermented Beverages, of which the following is a specification.

The invention relates to the art of brewing or producing fermented beverages, as beer and ale, and it consists in a novel compound to be added to the brew for the purpose of facilitating the process of manufacture and improving the products.

It is known that the desirable qualities of beer and ale are dependent upon the presence of acidity therein and that this acidity may, depending on certain factors which cannot always be relied upon or controlled, originate in the normal brewing process.

My invention comprehends the production of a compound which may be added to the brew for imparting, in an entirely reliable way, the proper acid character thereto and at the same time prevent the acidity thus created from, while conferring certain benefits, also effecting undesirable results, such as the production of extracts from the spelts of the malt which would cause the resulting beer or ale to have a harsh and disagreeable taste.

The object of my invention is, therefore, to provide a compound which may reliably impart the proper acid character to the brew and at the same time so control the action of the acid that no undesirable result shall flow from the use thereof.

A further purpose of the invention is to provide the compound in such form that it may be conveniently handled commercially and in the brewery and that its proper character may be maintained, so that it may, when used, be relied upon to perform its duties.

The compound of my invention comprises an alkali earth metal salt, such as calcium sulfate, or an admixture of alkali earth metal salts, such as calcium sulfate and magnesium monophosphate, and a suitable acid, as phosphoric acid or lactic acid, the whole being thoroughly commingled in suitable proportions to produce a uniform mass ready for use.

Various acids may be employed in my compound with beneficial effects, as, for illustration, phosphoric acid, lactic acid or sulfuric acid. Care must be taken to use a suitable acid or one not likely to have injurious effects on the human system. Preferably, the acids used will be either phosphoric acid or lactic acid or a mixture of these two acids, since these are the natural acids in beer and ale. The best results may be obtained in the compound itself, in respect of convenience and economy in commercially handling and caring for the same and in maintaining its reliable character or integrity, and in the proper action of the compound in use, when the acid employed is hygroscopic and intimately mixed as a concentrated solution, with the alkali metal earth salt, such as sulfate of calcium. Phosphoric and lactic acids are hygroscopic acids. Among the non-suitable acids, because of their effects on the human system, which are not to be used in my compound, may be mentioned salicylic acid, sulfurous acid and hydrofluoric acid.

The acid is added to the brew because of its beneficial effects and because the acidity originating in the normal brewing process cannot be relied upon. The effect of the added acid is the acceleration of the saccharification and running off of the mash and the increase of the yield and the soluble albumen, which latter effect enhances the foam keeping quality and brilliancy of the final beer or ale, even when subjected to low temperatures. The added acid also converts the undesirable carbonates, generally present in water, into more favorable salts, and is especially advantageous when raw grains or insufficiently aged malt are used, as these contain an insufficient amount of acids. Many acids, as phosphoric acid, lactic acid and sulfuric acid, exert a beneficial effect on yeast by regenerating a degenerated yeast and bringing to healthy condition infected yeast.

While very beneficial results flow from the use of the added acid, certain undesirable effects are also created thereby, as the creation of extracts from the spelts of the malt, which imparts to the resulting beer or ale a harsh and disagreeable taste.

With the addition to the acid, of an alkaline earth metal salt, as employed in my compound, the benefits derived from the use of the acid are preserved and the undesirable results which would otherwise flow from such use, are eliminated.

The most favorable results will usually be secured in the brew when fifty (50) parts of alkali earth metal salts or salt and five (5) parts of acid are present in one hundred thousand (100,000) parts of water, but I do not limit my invention to these proportions. I have found that of the alkali earth metal salts, sulfate of calcium and magnesium monophosphate produce the most satisfactory results, and these or either thereof I use with, by preference, phosphoric acid or lactic acid or a mixture of these two acids.

In preparing my compound for any special location or brewery, I first analyze the water to be used for the brew, and if I find any natural alkali earth metal salts therein, I make allowance for the same in the quantity of earth metal salt I mix with the acid. If, for instance, I should find that the water contained six (6) parts of alkali earth metal salts to one hundred thousand (100,000) parts of water, I would in such case only add to the acid such quantity of the salts as would with the six (6) parts naturally in the water, make fifty (50) parts of the salts to one hundred thousand (100,000) parts of the water.

Under general conditions, my preferred compound will contain about from thirty-five (35) to forty-five (45) parts of sulfate of calcium, about two and one-half (2½) parts of magnesium mono-phosphate and five (5) parts of acid, all uniformly mixed. I do not, however, confine my invention to the special proportions just stated for the substances entering into my compound.

In employing my compound it may be added to the water in the usual hot-water tank, and as all water needed for the brew is taken from this tank, all the materials of the brew will be equally treated. Should, however, conditions exist preventing the introduction of the compound to the hot-water tank, it may be added proportionately to the mash-tub, the cooker and the sparging water.

I have hereinbefore explained that in the preparation of my compound, I prefer to make use of a hygroscopic acid in concentrated solution; in the use of such acid I obtain a smooth uniform mixture which maintains its character for an indefinite period, does not dry-out or form hard granules, shows a more rapid solubility in water than when the sulfate of calcium and acid are separated or separately added to water and permits the successful handling of the acid and alkali earth metal salt in one manipulation and the shipping of the compound in wooden boxes, thereby eliminating the employment of glass vessels for the acid and saving labor, expense and risk of damage. The use of a hygroscopic acid, as described, is distinctly advantageous in my compound employing by preference sulfate of calcium, since the acid enters into intimate relation to the sulfate and prevents the same from losing its water by exposure and becoming hard granules difficult to bring into ready solution. Sulfate of calcium has a low solution rate, but the solution rate is increased in water in the presence of an acid, and in my preferred method of manufacturing my compound, the acid and the sulfate are in such intimate mixture and relation to each other that when the compound is added to the water the acidity thereby created may quickly act on the sulfate, with the result of improving the action of the compound for its intended purposes.

What I claim as my invention and desire to secure by Letters Patent, is:

1. A compound comprising calcium sulfate, magnesium monophosphate, uniformly co-mingled with acid for improving the process of brewing fermented beverages.

2. A compound comprising calcium sulfate and magnesium monophosphate uniformly co-mingled with phosphoric acid for improving the brewing of fermented beverages.

3. A compound comprising calcium sulfate and magnesium monophosphate uniformly co-mingled with a suitable hygroscopic acid for improving the process of brewing fermented beverages.

4. A compound comprising calcium sulfate and magnesium monophosphate uniformly co-mingled with phosphoric and lactic acids for improving the process of brewing fermented beverages.

5. A compound comprising calcium sulfate uniformly co-mingled with a suitable hygroscopic acid for improving the process of brewing fermented beverages.

Signed at New York city, in the county of New York and State of New York, this 25th day of July A. D. 1910.

LEO STEIN.

Witnesses:
ARTHUR MARION,
CHAS. C. GILL.